(12) United States Patent
Jenkins

(10) Patent No.: US 7,152,808 B2
(45) Date of Patent: Dec. 26, 2006

(54) FLUID SPRAY NOZZLE

(75) Inventor: Martyn Jenkins, Gwent (GB)

(73) Assignee: Kautex Textron CVS Limited

( * ) Notice: Subject to any disclaimer, the term of this patent is extended or adjusted under 35 U.S.C. 154(b) by 66 days.

(21) Appl. No.: 10/296,312

(22) PCT Filed: May 22, 2001

(86) PCT No.: PCT/GB01/02278

§ 371 (c)(1),
(2), (4) Date: Jun. 20, 2003

(87) PCT Pub. No.: WO01/89895

PCT Pub. Date: Nov. 29, 2001

(65) Prior Publication Data

US 2004/0026528 A1  Feb. 12, 2004

(30) Foreign Application Priority Data

May 22, 2000 (GB) ................... 0012356.2

(51) Int. Cl.
*B05B 1/10* (2006.01)
(52) U.S. Cl. ........................ 239/1; 239/284.1; 239/433; 239/543; 239/589.1; 239/587.4
(58) Field of Classification Search ............. 239/284.1, 239/284.2, 420, 433, 543, 544, 589.1, 596, 239/587.1, 587.4, 1, 11
See application file for complete search history.

(56) References Cited

U.S. PATENT DOCUMENTS

| 2,289,650 | A | * | 7/1942 | Horton .................. 239/284.1 |
| 2,703,258 | A | * | 3/1955 | Neufeld ................. 239/284.1 |
| 3,568,933 | A | * | 3/1971 | Macguire-Cooper ........ 239/543 |
| 4,368,505 | A | | 1/1983 | Tomforde |
| 4,413,780 | A | * | 11/1983 | Skinner et al. ......... 239/533.12 |
| 5,080,286 | A | * | 1/1992 | Morrison ................... 239/543 |
| 5,088,649 | A | * | 2/1992 | Hanson et al. ............. 239/543 |
| 5,358,179 | A | * | 10/1994 | Lund et al. ................. 239/544 |
| 5,516,045 | A | * | 5/1996 | Baudin ..................... 239/543 |
| 5,657,929 | A | * | 8/1997 | DeWitt et al. ........... 239/284.2 |
| 5,779,156 | A | * | 7/1998 | Crampton .................. 239/433 |
| 5,820,026 | A | * | 10/1998 | Raghu ..................... 239/284.1 |
| 5,890,661 | A | * | 4/1999 | Crampton et al. .......... 239/544 |
| 5,975,431 | A | | 11/1999 | Harita et al. |
| 6,322,008 | B1 | * | 11/2001 | Aker et al. ................. 239/543 |
| 6,554,210 | B1 | * | 4/2003 | Holt et al. ................ 239/284.2 |

FOREIGN PATENT DOCUMENTS

| EP | 0 046 608 A1 | 3/1982 |
| EP | 0 057 790 B1 | 8/1982 |
| EP | 0 091 758 A2 | 10/1983 |
| EP | 0 466 157 B1 | 1/1992 |
| EP | 0 521 061 B1 | 1/1993 |
| EP | 0 627 230 B1 | 12/1994 |
| EP | 0 640 401 A1 | 3/1995 |
| EP | 0 642 836 A2 | 3/1995 |
| EP | 0 717 095 A2 | 6/1996 |

(Continued)

*Primary Examiner*—Steven J. Ganey
(74) *Attorney, Agent, or Firm*—Rothwell, Figg, Ernst & Manbeck, P.C.

(57) ABSTRACT

A fluid spray is provided by apparatus (12) which includes jet spray (13) means for producing at least two jets of fluid (10,11). The jets of fluid at least partially intersect to thereby provide a predetermined spray pattern of fluid, preferably fan shaped. The jets of fluid (10,11), from nozzles, can be directed towards a vehicle windscreen or headlamp.

17 Claims, 5 Drawing Sheets

FOREIGN PATENT DOCUMENTS

| | | |
|---|---|---|
| EP | 0 839 578 A1 | 5/1998 |
| EP | 0 860 210 A2 | 8/1998 |
| GB | 1071420 | 6/1967 |
| WO | WO 83/01748 A1 | 5/1983 |
| WO | WO 93/14877 A1 | 8/1993 |
| WO | WO 95/05244 A1 | 2/1995 |
| WO | WO 95/18651 A1 | 7/1995 |
| WO | WO 95/31291 A1 | 11/1995 |
| WO | WO 97/07897 A1 | 3/1997 |
| WO | WO 97/11784 A1 | 4/1997 |
| WO | WO 97/18042 A1 | 5/1997 |
| WO | WO 97/33646 A1 | 9/1997 |
| WO | WO 97/41963 A1 | 11/1997 |
| WO | WO 98/23382 A1 | 6/1998 |
| WO | WO 00/41814 A1 | 7/2000 |
| WO | WO 00/67912 A1 | 11/2000 |

* cited by examiner

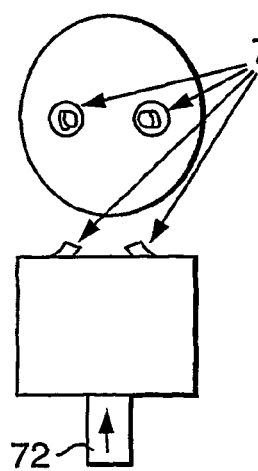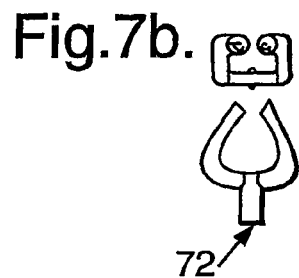
Fig.7a.  Fig.7b.
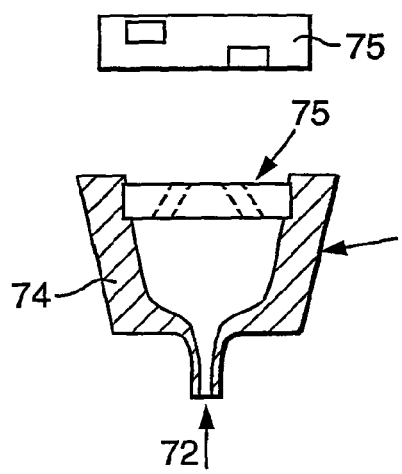
Fig.7c.
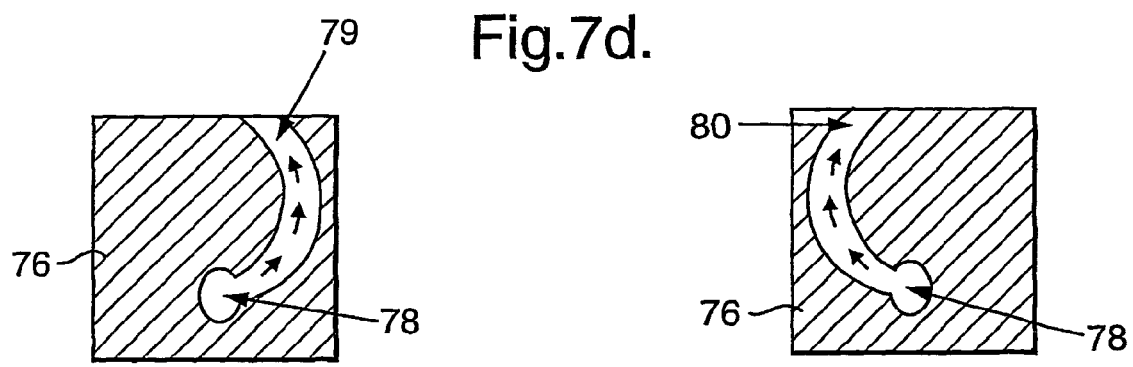
Fig.7d.
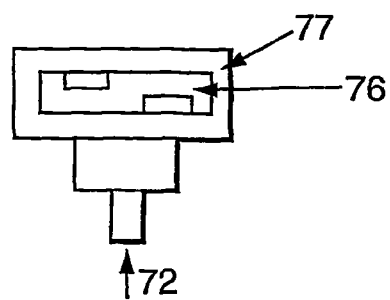

FLUID SPRAY NOZZLE

The present invention relates to spray nozzles for vehicular screen wash systems. In particular, but not exclusively, the invention relates to a spray apparatus which is able to produce a "fan" shaped fluid spray for use in windscreen washers and headlamp washers.

A number of systems exist for cleaning the headlamps and windscreens of vehicles. One of these systems utilises a nozzle which includes two apertures which are directed away from each other. This produces two columns of cleaning fluid which can be directed on the screen which requires cleaning. Such a system is not very efficient at cleaning since much of the fluid sprayed from the nozzle is wasted or tends to overly reduce visibility through the screen.

An improved system uses a fan type jet which is sprayed on the vehicle screen. In this system a fan shaped spray is produced in which most of the fluid lies substantially in a single plane but which fans out from the nozzle itself. In order to produce such a fan type spray a fluid logic element is required in the nozzle. This nozzle produces a single column of fluid but oscillates from side to side rapidly to spread the spray into the fan shape. Such a device is described in U.S. Pat. No. 4,508,267.

However production of such nozzles is complicated and expensive to manufacture. Furthermore use of the solid state fluid logic element means that the nozzle is also susceptible to faulty operation.

It is an object of the present invention to at least partly mitigate the above-mentioned problems.

It is a further object of embodiments of the present invention to provide a spray nozzle which produces an efficient screen washing system.

According to one aspect of the present invention there is provided apparatus for providing a fluid spray comprising jet spray means for producing at least two jets of fluid, said jets of fluid at least partially intersecting to thereby provide a predetermined spray pattern of fluid.

Preferably the jet spray means comprises at least two orifices each disposed so that the jets of fluid exit each orifice as a column of fluid are directed towards the column of fluid exiting the other orifice.

Conveniently the orifices are disposed offset from one another so that only a portion of the cross sectional area of the columns of fluid intersect.

Advantageously the predetermined spray pattern is a fan type spray pattern.

Preferably the apparatus is a fluid spray noble.

According to a second aspect of the present invention there is provided a method of providing a predetermined spray pattern comprising the steps of producing at least two jets of fluid, and directing said jets in a direction so that they at least partially intersect.

Embodiments of the present invention will now be described hereinafter with reference to the accompanying drawings in which:

FIGS. 7a, 7b, 7c and 7d illustrate different nozzles and orifice arrangements.

Figure 1A:
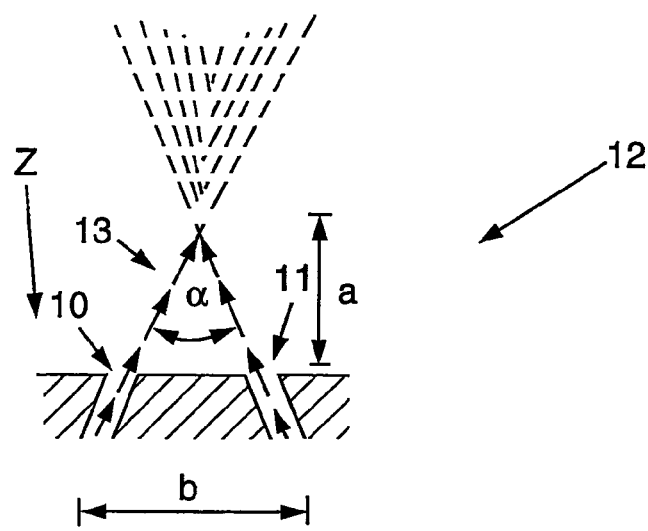
FIGS. 1a and 1b show views of an arrangement of nozzle orifices.
Figure 1B:
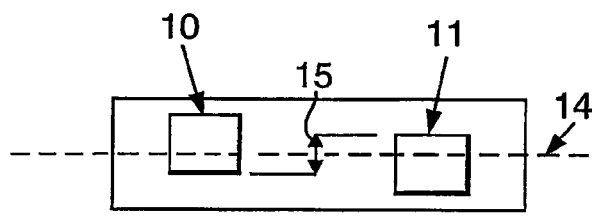

FIGS. 1a and 1b illustrate how the orifices 10, 11 of a spray apparatus 12 such as a spray nozzle according to a first embodiment of the present invention are arranged. The orifices are square, although circular apertures can be used. The orifices are formed in a nozzle, not shown, which can be arranged on a vehicle such as an automobile. The nozzles can be directed so that fluid sprayed from the nozzle sprays a vehicle screen for cleaning. Such a screen could be a windscreen or headlamp. FIG. 1a shows a view from above whilst FIG. 1b illustrates a view in the direction of arrow Z in FIG. 1a.

Cleaning fluid 13 is ejected from the orifices by means of pumps not shown. Other devices capable of ejecting fluid under pressure could be used.

The orifices are angled and shaped so that fluid exits each of the orifices as a column of fluid. The two columns of fluid intersect an angle of 60° to one another in a region proximate to the spray nozzle. Other angles of intersection could be used.

The jet orifices overlap over an imaginary centre line 14 shown in FIG. 1b. By selecting the degree of overlap 15 and selecting the angle at which the fluid jets intersect the shape of the fluid spray which results can be tailored according to a desired shape and/or pattern. Preferably the pattern of spray is fan shaped as this results in a substantially uniplanar spray which can cover the largest area of a vehicle screen without wasting cleaning fluid such as water.

Also by changing the ratio between the surface area of the fluid jet which intersects and the surface area which does not intersect the "fan" spray pattern characteristics are changed. The fan spray pattern can be produced by jets of a suitable size for motor vehicle screen wash and headlamp wash systems. Typical jet sizes tested include 0.8 mm nominal diameter and 0.8 mm square orifices.

For example with two jets both of 0.8 mm square dimensions and aligned so as to partially intersect at an included angle ∝ of 60° at a distance a of approximately 3 to 4 mm from the fluid outlets a fan spray pattern of approximately 60° is produced. This is with a dimension b of approximately 5 to 6 mm.

Figure 2A:
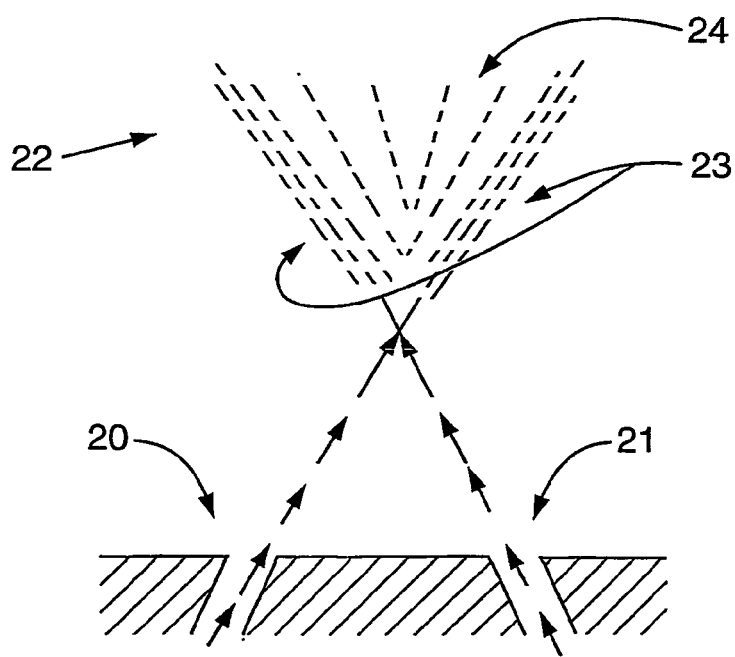
FIGS. 2a and 2b illustrate views of a second arrangement of nozzle orifices.
Figure 2B:
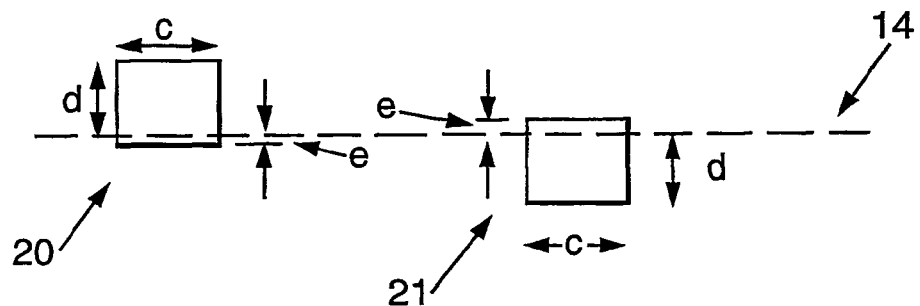

FIGS. 2a and 2b illustrate a second embodiment of the present invention in which the overlap of the orifices 20, 21 is reduced. As a result less of the column of fluid exiting each orifice intersects. As a result the spray pattern distilled from the nozzle is altered accordingly. In particular in this configuration the resulting fan spray 22 has heavy concentrations of fluid in the outer edge 23 region of the fan pattern whilst a light spray of fluid is achieved in between the middle 24 of the fan.

If the intersecting area is approximately 0.1 mm×0.8 mm then the fan produced has a heavy concentration of fluid on the two outer edges with a light spray in between these two edges. This can be produced by using square fluid outlets having dimension c equal to 0.8 mm, dimension d equal to 0.75 mm and dimension e equal to 0.5 mm.

Figure 3A:
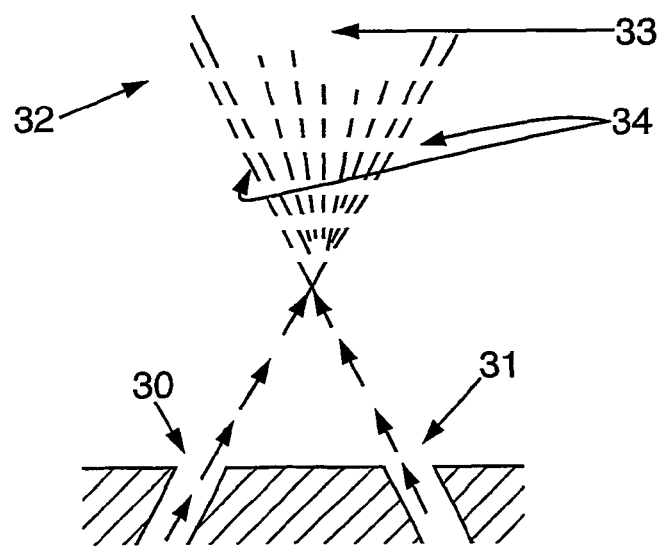
FIGS. 3a and 3b illustrate views of a third arrangement of nozzle orifices.
Figure 3B:
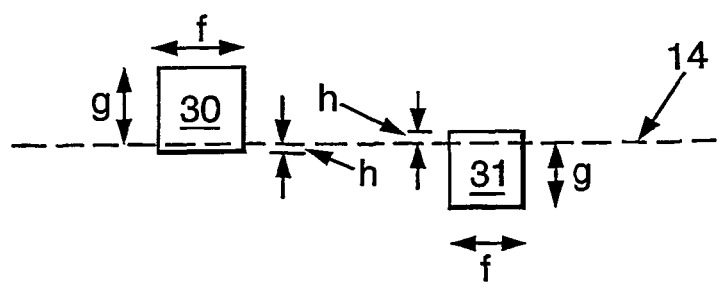

FIGS. 3a and 3b illustrate a third embodiment of the present invention in which the offset of the orifices 30, 31 from a centre line is reduced from that of FIGS. 2a and 2b. If the intersecting area is approximately 0.2 mm by 0.8 mm the fan spray pattern 32 produced has less concentration of fluid on the two outer edges with a heavier spray in between these two edges relative to those concentrations shown in FIGS. 2a and 2b. The result is still a light spray in between in region 33 with a heavy concentration on the outer edges 34. This may be achieved with dimensions f equal to 0.8 mm, dimension g equal to 0.7 mm and dimension h equal to 0.1 mm.

Figure 4A:
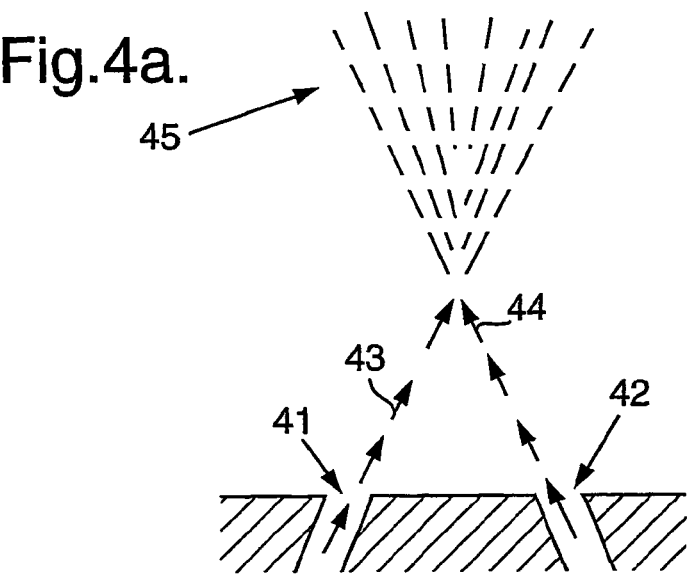
FIGS. 4a and 4b illustrate views of a fourth arrangement of nozzle orifices.
Figure 4B:
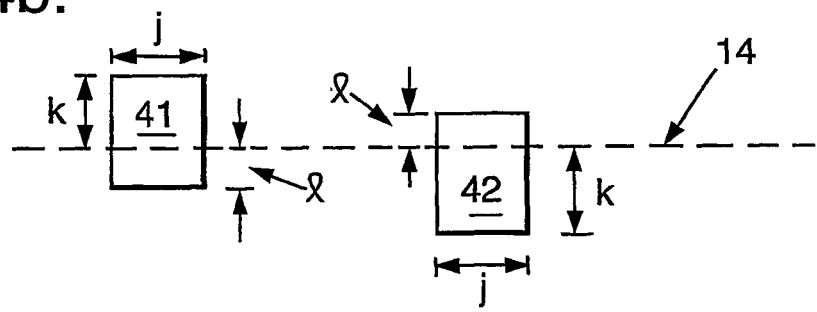

FIGS. 4a and 4b illustrate views of a fourth embodiment of the present invention in which the offset of the orifices 41, 42 from the centre line 14 is further reduced. In this way the columns 43, 44 of cleaning fluid exit the nozzle is more of a face to face manner and thus the cross sectional area of the columns of fluid which intersect is increased. The resulting fan spray 45 has a more or less even concentration of fluid at the edges and in between. The result is an almost even spray with light concentrations on the edges. If the intersecting area is approximately 0.4 mm×0.8 mm the fan spray is almost even with a lighter concentration on the two outer edges with a still heavier spray in between the two edges. In order to produce this square orifices could be used having a dimension j equal to 0.8 mm, a dimension k equal to 0.6 mm and dimension l equal to 0.2 mm.

Figure 5A:
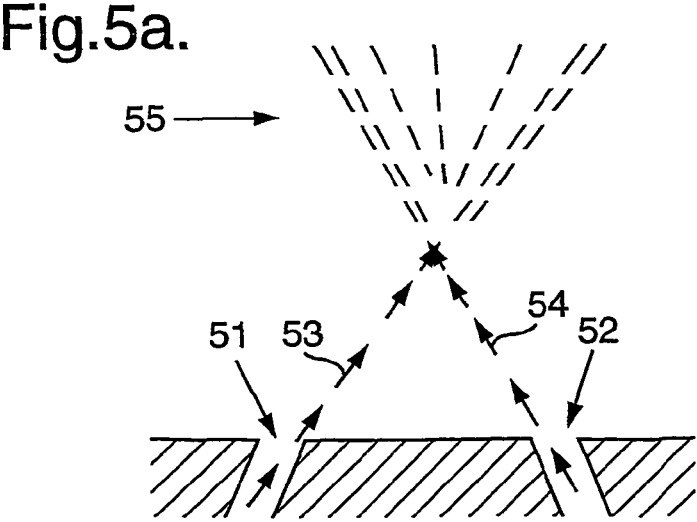
FIGS. 5a and 5b illustrate views of a fifth arrangement of nozzle orifices.
Figure 5B:
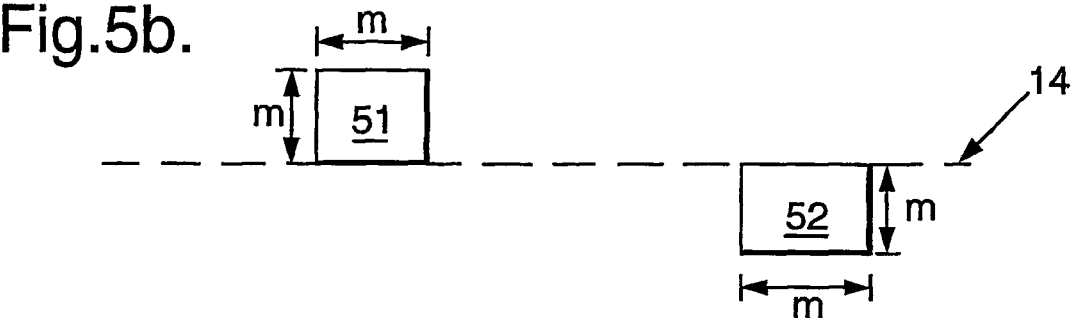

FIGS. 5a and 5b illustrate a fifth embodiment of the present invention in which there is zero overlap of the orifices 51, 52 across the imaginary centre line 14. As a result only the edges of the column 53, 54 of jet spray emitted from each orifice will overlap. The result is a fan spray 55 from the nozzle which has a large/great concentration of fluid at the edges of the fan with a lighter concentration in the centre/middle of the spray. This can be achieved with square orifices having dimension m equal to 0.8 mm.

Thus even when the two orifices are positioned so that the resulting sprays do not substantially overlap but that one side of each orifice coincides with one side of the other orifice a fan spray pattern is produced where the two outer edges are strongest concentrated and the spray in between the two edges is the lightest.

Figure 6A:
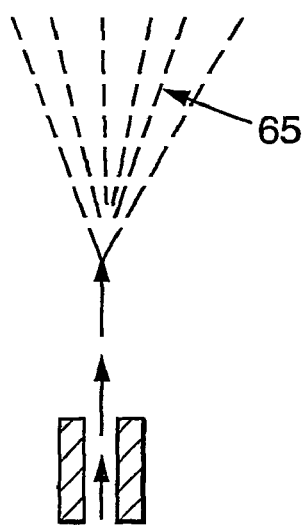
FIGS. 6a, 6b and 6c illustrate views of a sixth arrangement of nozzle orifices.
Figure 6B:
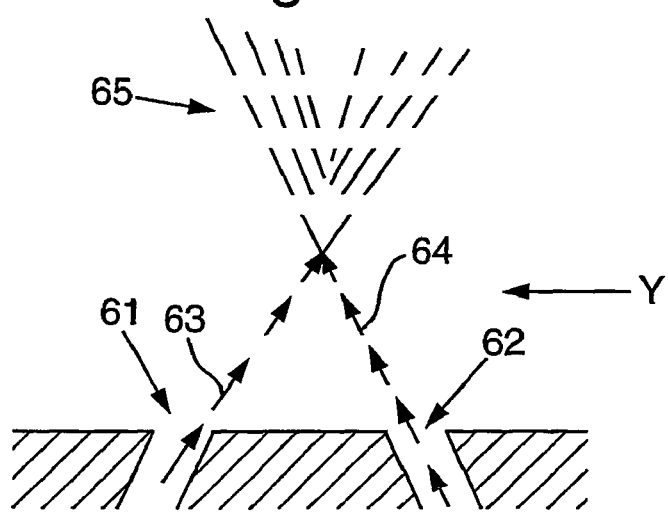
Figure 6C:
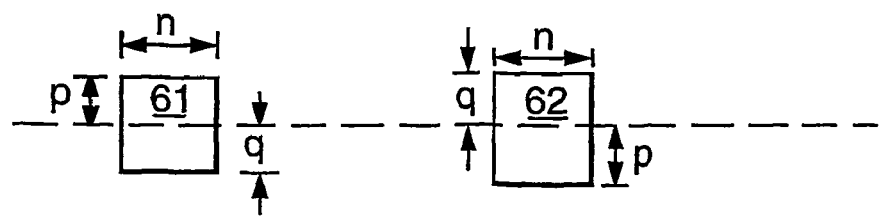

FIGS. 6a, 6b and 6c illustrate a sixth embodiment of the present invention in which the orifices 61, 61 are fully opposed so that the jet sprays 63, 64 exiting the orifices intersect fully just a short distance from the nozzle. The result is a spray pattern 65 which is substantially conical like a three dimensional fan. FIG. 6a is a view taken in the direction of Y from FIG. 6b. The fan spray pattern can be achieved using square orifices having dimension n equal to 0.8 mm, p equal to 0.4 mm and q equal to 0.4 mm.

FIGS. 7a, 7b, 7c and 7d illustrate different nozzle and orifice arrangements which can be used to produce the jet spray.

FIG. 7a illustrates use of adjustable "eyeball" orifices by adjusting the direction of the eyeballs 71 the angle with which the spray jets leave the nozzle together with the offset with respect to one another can be set to select a predetermined spray pattern. FIG. 7a includes an upper top view and lower plan view and includes an inlet 72 for fluid in the lower plan view.

FIG. 7b illustrates an alternative configuration using pipes or tubes which enable the required angle and offset to be achieved. FIG. 7b includes an upper top view and lower plan view and includes an inlet 72 for fluid in the lower view.

FIG. 7c illustrates a still further alternative for producing the orifices in the fluid spray nozzle. Fluid can be pumped via inlet 72 into a nozzle housing 73 in any suitable way. The housing includes a body portion 74 which is closed at an exit end by a plate 75. The plate is drilled or pierced or moulded in such a way as to provide orifices in it. By selecting the size and shape and angle of the orifices together with an offset which determines what proportion or ratio of the fluid spray jets interact, the final spray pattern from the spray nozzle can be selected.

FIG. 7c includes a lower side view of the body and plate and an upper view of just the front of the plate.

FIG. 7d illustrates a still further alternative for producing the orifices in the fluid spray nozzle. This includes an insert 76 which can be secured in the nozzle body 77. The insert includes a central feed port 78 through which fluid can be pumped or otherwise introduced. Two fluid channels 79, 80 are formed at different heights in the insert and are generally arcuate in shape so that as fluid exits each channel the two ensuing columns of fluid interact as above described. By selecting the vertical distance at which fluid exits the orifices the offset with respect to each other can be selected. FIG. 7d includes an upper view from the top of the insert, a middle view of the underside of the insert and a lower view from the front of the insert in the body moulding.

The fluid droplet size produced within the spray pattern of the intersecting jets has been observed to be suitable for the application of motor vehicle screen wash and headlamp wash systems under both static and dynamic conditions.

Different methods of producing two jets or more which intersect or partially intersect could be used such as described above. It will be understood that more than two jets of fluid could be used providing the ratio of intersecting fluid sprays is carefully controlled. It will also be understood that the number of jet sprays used could be provided by separate spray nozzles closely spaced.

It will be understood by a person skilled in the art that alternatives to the above recited alternatives could be made without departing from the scope of the present invention.

The invention claimed is:

1. A liquid washer for a vehicle for providing a spray of cleaning liquid comprising:
   jet spray means for producing at least two jets of the liquid said jets of liquid at least partially intersecting to thereby provide a predetermined spray pattern of liquid, wherein at least two orifices are disposed such that jets of the liquid exit each orifice as a column of liquid directed towards a column of liquid exiting the other orifice, such that said predetermined spray pattern is provided by selecting the degree of overlap of the jets of liquid and the angle at which they intersect, wherein the orifices are disposed offset from one another so that only a portion of the cross sectional area of the columns of liquid intersect.

2. A liquid washer according to claim 1, wherein the liquid jets intersect in a region proximate to said apparatus.

3. A liquid washer according to claim 1 further comprising jet directing means for varying the direction in which the jets are sprayed.

4. A liquid washer according to claim 1, wherein said jets have a liquid drop size which is greater on edges of the jets than in the centre.

5. A liquid washer according to claim 1, wherein said jet spray means comprises two generally arcuate channels on either side of a central feed port.

6. A liquid washer according to claim 1, in which the predetermined spray pattern is a fan type spray pattern.

7. A liquid washer according to claim 6 in which the concentration of liquid at outer edges of the fan type spray pattern is greater than the liquid concentration between the edges.

8. A liquid washer according to claim 6 in which the concentration of liquid at outer edges of the fan type spray pattern is lesser than the liquid concentration between the edges.

9. A liquid washer according to claim 1 in which said liquid washer comprises a liquid spray nozzle.

10. A liquid washer according to claim 9 in which the nozzle comprises a screen wash nozzle.

11. A liquid washer according to claim 1, in which between 0% and 50% of the cross-sectional area of the column of liquid of each jet overlaps.

12. A liquid washer according to claim 9 in which said nozzle comprises a windscreen washer for a vehicle.

13. A liquid washer according to claim 9 in which said nozzle comprises a headlamp washer for a vehicle.

14. A method of providing a predetermined spray pattern comprising the steps of:

producing at least two jets of liquid wherein one of the jets of liquid exits an orifice of a liquid washer as a column of liquid directed towards the other jet of liquid exiting another orifice of the liquid washer as a column of liquid;

directing said jets in a direction so that they at least partially intersect;

selecting the degree of overlap of the liquid jets and the angle at which they intersect; and varying the direction of said jets to thereby vary the concentration of liquid in edge and centre regions of the spray pattern.

15. The method according to claim 14 further comprising the steps of: varying the direction of said jets to thereby vary a liquid drop size in said jets.

16. A method according to claim 14 wherein said predetermined spray pattern is a fan spray pattern.

17. The method according to claim 14 further comprising the steps of varying the jet's direction to thereby produce a spray pattern having reduced the liquid fill in between edges of the jet sprays.

* * * * *